United States Patent [19]

Scuka et al.

[11] Patent Number: 4,625,256
[45] Date of Patent: Nov. 25, 1986

[54] OVERVOLTAGE PROTECTOR FOR A DEVICE HAVING TWO PARTS MOVABLE RELATIVELY TO EACH OTHER

[75] Inventors: Viktor Scuka, Trollbäcksvägen; John Åkerlund, Vasavägen, both of Sweden

[73] Assignee: Telefonaktiebolaget LM Ericsson, Stockholm, Sweden

[21] Appl. No.: 616,213
[22] PCT Filed: Oct. 10, 1983
[86] PCT No.: PCT/SE83/00349
  § 371 Date: May 18, 1984
  § 102(e) Date: May 18, 1984
[87] PCT Pub. No.: WO84/01673
  PCT Pub. Date: Apr. 26, 1984

[30] Foreign Application Priority Data

Oct. 15, 1982 [SE] Sweden ............... 8205876

[51] Int. Cl.[4] ............................................. H02H 3/22
[52] U.S. Cl. ................................... 361/117; 361/212
[58] Field of Search ............... 361/117, 212, 220, 221; 384/277, 492

[56] References Cited

U.S. PATENT DOCUMENTS

| | | | |
|---|---|---|---|
| 392,400 | 11/1888 | Belfield | 361/222 |
| 1,201,328 | 10/1916 | Moran | 384/492 |
| 2,256,118 | 9/1941 | Kyropoulos | 361/212 X |
| 2,599,951 | 6/1952 | Stanton | 361/117 |
| 2,778,635 | 1/1957 | Eash | 361/222 |
| 4,177,493 | 12/1979 | Bliamptis | 361/117 |

OTHER PUBLICATIONS

*Power Engineering*, vol. 58, issue No. 5, May 1954, pp. 73 & 74.
Beck, *Westinghouse Engineer*, vol. 9, issue No. 3, May 1949, pp. 72 & 73.

*Primary Examiner*—A. D. Pellinen
*Assistant Examiner*—A. Jonathan Wysocki
*Attorney, Agent, or Firm*—Roberts, Spiecens & Cohen

[57] ABSTRACT

An overvoltage protector in an apparatus having two moving parts (1,5). The parts are connected via a bearing (2,3,4), one part being stationary in relation to a substructure (13) at an electrical ground potential. The moving part (5) can be subjected to a voltage and the stationary part (1) is electrically connected to the grounded substructure. For preventing current from passing through the bearing between the parts, an electrical insulator (6,7) is provided in the current path which can occur through the bearing as a result of different potentials of the parts. The moving part (5) has a ring (9) spaced from a ring (8) connected to electrical ground such that a spark discharge gap (10) is formed between the parts. The bearings (2,3,4) are protected against current flow by the electrical insulator (6,7) up to a given voltage threshold. In order that this voltage threshold will not be exceeded, the spark discharge gap (10) comes into operation at a lower value than this voltage threshold and keeps the voltage difference between the parts at this lower value.

5 Claims, 1 Drawing Figure

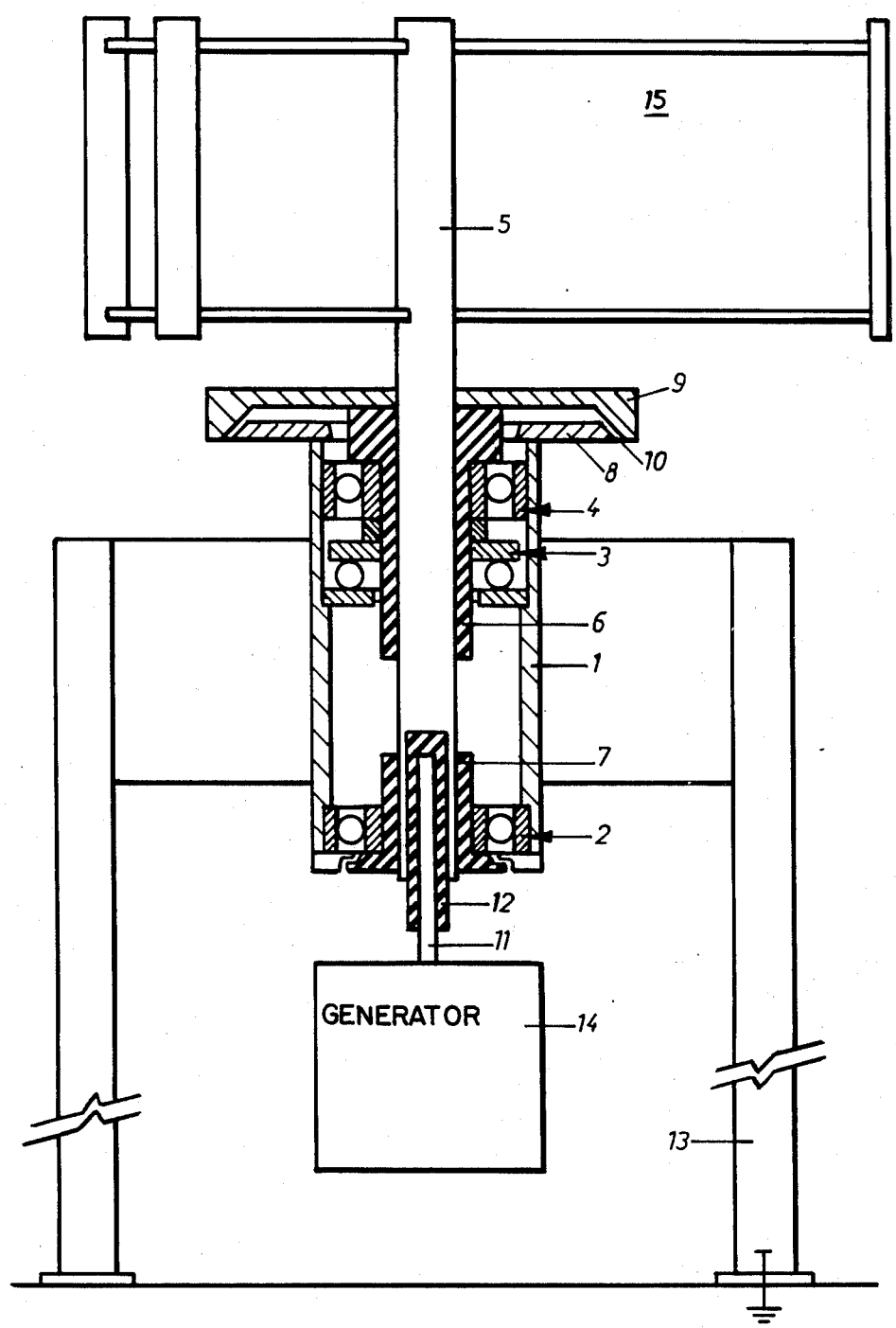

OVERVOLTAGE PROTECTOR FOR A DEVICE HAVING TWO PARTS MOVABLE RELATIVELY TO EACH OTHER

FIELD OF THE INVENTION

The invention relates to an overvoltage proctector for a device having two parts movable relative to each other, one of which is stationary in relation to a frame at ground potential, said parts being connected with each other via at least one bearing, the movable part being subjected to an electrical voltage and the stationary part being electrically connected to the frame.

BACKGROUND

In apparatus with mutually moving parts which are connected to each other via a bearing and are subjected to different electrical potentials, there is the risk that a current path can occur through the bearing. The current passing the bearing surfaces may be of magnitude that the bearing is damaged by pitting of the bearing surfaces. It is known to protect the bearings by insulating the bearing seatings in the cases where the voltage difference is small, as is the case, for example, for asynchronous machines. This is not satisfactory when there are large voltage differences, since there is the risk of flashover. Examples of this are to be found in wind turbines and radar antennae which are subjected to lightning.

SUMMARY OF THE INVENTION

The problems mentioned above are solved by providing the bearing with insulation while the moving part is provided with a spark discharge gap at the same time.

The bearing is protected by the insulation against electric current up to a given voltage threshold. In order that this voltage threshold will not be exceeded, the spark discharge gap comes into operation and lowers the voltage.

BRIEF DESCRIPTION OF THE DRAWING

The sole FIGURE of the drawing shows, partly in section, an elevational view of one embodiment of apparatus according to the invention.

DETAILED DESCRIPTION OF A PREFERRED EMBODIMENT

The invention will now be described in detail with reference to the appended drawing. Therein is seen a bearing housing 1 with ball bearings 2, 3 and 4, which carry a shaft 5, for example, the shaft of a wind turbine 15. The shaft is insulated from the ball bearings by bearing seatings 6 and 7, consisting of material with high electrical insulation power. The housing is connected to electrical ground potential by a frame 13, and carries at one end a ring 8 having a bevelled outer edge. The shaft supports a ring 9 coacting with, and surrounding the ring 8, and having an inner surface with a bevel corresponding to that of the outer edge of the ring 8, such that a circular gap 10 is formed between the two rings. This gap constitutes an electrical flashover zone during a spark discharge. The shaft 11 of a machine 14 such as a generator, which is driven by the shaft 5, is connected to the shaft via an insulating part 12. The thickness and material of the bering seatings 6 and 7, which determine the dielectric strength, and the axial extension of said seatings, which determines the flashover resistance, are such in relation to the insulation power of the gap 10 that the flashover voltage is lower across the gap than the dielectrical breakdown voltage and the flashover voltage over the bearing seatings. If the shaft is subjected to a voltage lower than the flashover voltage, the insulating bearing seatings prevent current from passing through the bearings. For a voltage exceeding the flashover voltage of the air gap, e.g. lightning, a spark discharge is produced in the gap 10 which limits the voltage which can occur at the bearing seatings.

As an alternative to the described embodiment, instead of insulating bearing seatings, the shaft may be provided with an insulating layer or consist entirely of insulating material at the portion in contact with the bearings. If the shaft is mounted in journal bearings, the bushes themselves may consist of insulating material. The arrangement in accordance with the invention thus protects the bearings from conducting current and thus being destroyed. Bearing damage in a wind turbine or radar antenna results in great inconvenience, since the entire machine must be taken down from its tower and transported to a workshop for repairs. Other inconveniences are also avoided. The gap 10 works without friction and is only worn during spark discharges. These parts can easily be dimensioned for long life and can be made easily exchangeable.

The invention is not limited to the described embodiment and can also be applied to bearings for linear movement, e.g. where a bearing carries a slide on a path along which the slide can move. The bearing is electrically insulated from the slide. The zone for spark discharge consists in this case of a projection on the slide and an electrically conductive rail running alongside the path at a distance from the projection.

What is claimed is:

1. Overvoltage protected apparatus comprising a first stationary member at ground potential, a second movable member subject to electrical voltage, bearing means between said members to provide relative movement therebetween, and overvoltage protection means for opposing current flow through said bearing means between said members, said overvoltage protection means comprising electrical insulative means between said bearing means and said second member to prevent current flow between said members due to voltage difference between said members thereby to protect said bearing means from damage due to current flow therethrough, and means on said members providing a spark gap therebetween which remains substantially constant during relative movement of said members, the combination of said electrical insulation means and said spark gap preventing current flow through the bearing means due to voltage difference between said members resulting from movement of the second movable member and the grounded stationary member as well as due to application of external voltage to said movable member.

2. Apparatus as claimed in claim 1 wherein said electrical insulation means between said bearing means and said second movable member has a dielectrical breakdown voltage and flashover voltage which is greater than the flashover voltage at said gap.

3. Apparatus as claimed in claim 2 wherein said electrical insulation means comprises electrically insulating bearing seats for said bearing means, said seats being mounted on said movable member.

4. Apparatus as claimed in claim 2 wherein said means providing the spark gap comprises first and second rings respectively on said first and second members defining said spark gap therebetween.

5. Apparatus as claimed in claim 4 wherein said rings extend radially from said members to form said gap around said bearing means at a radial distance therefrom.

* * * * *